United States Patent Office 3,470,511
Patented Sept. 30, 1969

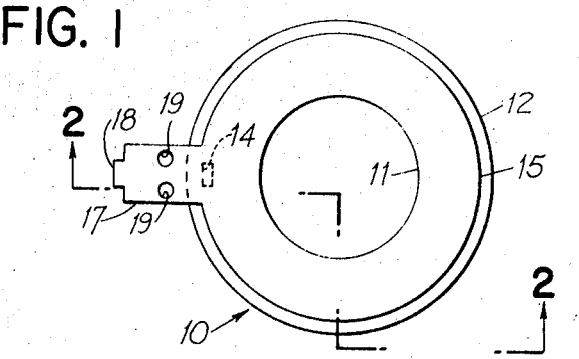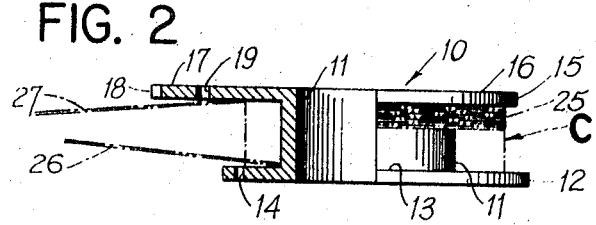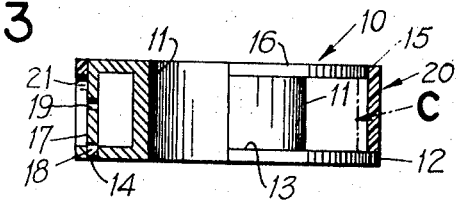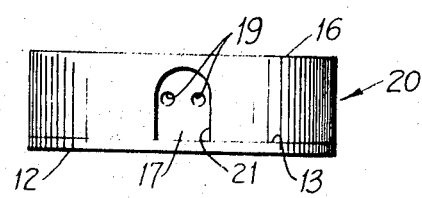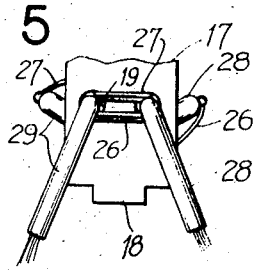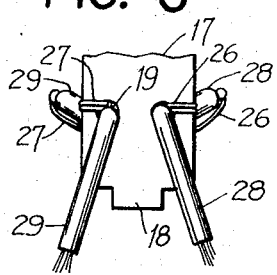
INVENTOR.
ROBERT A. HEINZEN
AGENT

3,470,511
COIL AND SPOOL THEREFOR
Robert A. Heinzen, Manitowoc, Wis., assignor to American Machine & Foundry Co., a corporation of New Jersey
Filed Nov. 28, 1967, Ser. No. 686,200
Int. Cl. H01f 7/06, 3/06, 15/10
U.S. Cl. 335—296                                                12 Claims

ABSTRACT OF THE DISCLOSURE

A spool assembly for electromagnetic coils comprising a spool of dielectric material having a tubular body with outwardly extending annular flanges of unequal diameters at its ends defining an annular chamber for a wire winding; a flap extending from the smaller flange, on which the free ends of the wire winding is wrapped, being displaceable toward the larger flange and having a tab at its free end insertable into a slot in the larger flange to retain the flap; and a closure ring encircling the smaller flange at one end, abutting the larger flange at its other end, and having an open end slot exposing the flap therethrough.

---

This invention relates generally to electromagnetic coils and more particularly to spools and spool assemblies therefor.

Coils of this general type can be embodied in motors, solenoids, relays and other electromagnetic devices for providing a magnetic field in response to energization.

It is old in the art to wind wire on a spool which is then taped to retain the winding. The wire ends are left free for connection to coil leads which, in turn, are connected as required to a power source for energizing the coil.

However, little has been accomplished in providing means for retaining the wound wire ends prior to connection of the coil leads, protecting coil lead connections, or providing a protectively packaged coil.

Accordingly, an object of the present invention is to provide a spool, to be wire wound, having means for retaining the loose ends of the wound wire and eliminating the necessity of taping the winding.

Another object of the present invention is to provide the foregoing spool capable of retaining coil leads and preventing their separation from the ends of the wound wire.

And, another object of the present invention is to provide the foregoing spool with an enclosure ring to provide a protectively enclosed coil.

The present invention contemplates a spool of dielectric material to be wire wound having a tubular body and a pair of annular flanges each extending radially from a different end of the body; one of said flanges having a flap extending radially therefrom adapted to receive and retain the free ends of a wire wound on said spool; said flap being displaceable toward the other of said flanges and with said other flange having interlocking means for retaining said flap in its displaced position; and an annular member of dielectric capable of assembly on said spool to provide a protective enclosure for a wire winding.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

FIGURE 1 is a plan view of a spool made in accordance with the present invention;

FIGURE 2 is a view half in section and half in elevation which is taken on line 2—2 of FIGURE 1;

FIGURE 3 is a view similar to FIGURE 2 with a closure ring assembled on the spool;

FIGURE 4 is an elevational view of the spool assembly of FIGURE 3; and

FIGURES 5 and 6 are enlarged fragmentary elevational views illustrating two ways of connecting coil leads to the ends of a wire wound on the novel spool.

Referring now to the drawings and particularly to FIGURES 1 and 2, a spool 10 in accordance with the present invention is made of a suitable dielectric material which is flexible to some degree and is to be wire wound to provide a coil C, as is indicated, for a motor, solenoid or another electromagnetic device.

The spool 10 has a tubular body or body portion 11 which is provided with a pair of spaced annular flanges or flange portions 12 and 15, each being disposed at a different end of the body portion. The flanges 12 and 15 extend radially outwardly from the body portion 11 and are of unequal diameters, in this instance, flange 12 being larger in diameter than flange 15. As should be noted in FIGURE 2, the body 11 with the spaced flanges 12 and 15 form or define an annular chamber which is of U-shape in cross-section for retaining the coil C.

The smaller flange 15 is provided with a flap 17 which extends radially therefrom and terminates in a free end which is formed to provide a tab 18. Flap 17 is provided with a pair of openings 19, as is best shown in FIGURE 1. When winding a wire 25 on the spool 10 to form the coil C, enough of its ends 26 and 27 should remain free and extend from the coil preferably in angular alignment with flap 17. The ends 26 and 27 of wire 25, at this time, are connected to flap 17 by lacing and/or are connected to coil leads 28 and 29, respectively, in any suitable manner as will be further discussed with reference to FIGURES 5 and 6.

Flap 17 is bent or displaced to extend axially across the exposed face coil C and toward the larger flange 12, as best shown in FIGURE 3. When so displaced, flap 17 is disposed within the limits of the annular periphery of flange 15 although it extends axially therefrom. A slot 14 is provided in the larger flange 12 which is angularly aligned to receive and retain the tab 18 for holding the flap 17 in its displaced position.

To prtect the coil C, a tubular member or closure ring 20, also of a suitable dielectric material, may be provided as shown in FIGURES 3 and 4. The inner and outer peripheries of the ring 20 preferably are equal in diameter to the outer annular peripheries of flanges 15 and 12, respectively, and its axial length preferably is equal to the axial distance between the inner planar surface 13 of flange 12 and the outer planar surface 16 of flange 15.

The closure ring 20 is assembled on spool 10 by being positioned on the smaller flange 15 and being moved axially into abutment with the inner surface 13 of flange 12. The assembled spool 10 with the closure ring 20 provides a neat disc shaped package with an axial opening therethrough. When made in the preferred manner as previously discussed the formed package will be provided with smooth surfaces at the abuting portions of the spool 10 and ring 20.

To prevent interference with the coil leads 28 and 29 when ring 20 is assembled on spool 10, the ring is provided with an axial slot 21 open at the end of the ring which abuts the inner planar surface 13 of flange 12, as is best shown in FIGURE 4. The width of slot 21 preferably is smaller than the width of flap 17 which results in overlapping of the flap 17 by the ring 20. This provides a substantially sealed entrance for the coil leads 28 and 29, and further retains flap 17 in its displaced position. As shown in FIGURE 3, the body 11, flanges 12 and 15 of spool 10 with flap 17 and ring 20 now define a closed annular coil chamber.

As shown in FIGURE 5, the ends 26 and 27, of wire 25 may be laced through openings 19 in opposite directions to one another and around the portion of flap 17 between the two openings. Alternatively, as shown in FIGURE 6, the wire ends 26 and 27 are each laced through a different opening 19 and around the side portion of flap 17 adjacent thereto.

If coil leads are not to be immediately connected, in each wrapping arrangement, the wire ends 26 and 27 may be left free after such wrapping or may be loosely looped together. However, as shown, it is preferable to insert the coil leads 28 and 29 each through a different opening 19 and to connect such leads to wire ends 26 and 27, respectively. It should be understood that the wire ends 26 and 27 can terminate outwardly of flap 17 and, to avoid removal of ring 20 and tab 18 from slot 14, the coil leads may be connected directly thereto.

Therefore, it should now be understood that in accordance with the present invention a novel spool is provided which is wire wound, and has means for retaining the ends of the wound wire and for facilitating the connection of coil leads to such wire ends. It should be further understood that a closure ring can be assembled on the wire wound novel spool to provide a smooth compact package with a protected coil therein.

Although several embodiments of the invention have been illustrated and described in detail, it is to be expressly understood that the invention is not limited thereto. Various changes may be made in the design and arrangement of the parts without departing from the spirit and scope of the invention as the same will now be understood by those skilled in the art.

I claim:
1. In an electromagnetic coil, a combination comprising:
   a spool having a tubular body and a pair of axially spaced annular flanges each extending radially from a different end of the body to provide an annular U-shaped chamber for a wire winding;
   one of said flanges having a flap extending radially therefrom outwardly of the annular periphery of said one flange;
   said flap being adapted for connection thereto and retention thereby of free ends of a wire winding disposed in the annular chamber, and being displaceable axially from said one flange to the other of said flanges and across the exposed face of a wire coil disposed in annular chamber; and
   said flap and other flange having interengaging means for retaining said flap when it is axially displaced.
2. The coil in accordance with claim 1, wherein:
   said spool is of unitary construction of a dielectric material;
   said flanges are disposed in spaced substantially parallel planes which are normal to said body; and
   said flap is normally disposed before it is displaced in substantially the same plane as said first flange.
3. The coil in accordance with claim 1, wherein:
   said spool is of unitary construction of a dielectric material;
   said flap has a free end and a tab extending therefrom; and
   said other flange has a slot angularly aligned to receive said tab when said flap is displaced;
   said tab and slot forming said interengaging means for retaining said flap when it is displaced.
4. The coil in accordance with claim 3, wherein:
   said flap has a pair of openings each for passing a free end of a wire winding outwardly therethrough to be wrapped on said flap for connection thereto.
5. The coil in accordance with claim 3, wherein:
   said flap has a pair of openings each for passing a free end of a wire winding outwardly therethrough to be wrapped on said flap for connection thereto; and
   each of said openings being of sufficient size to pass a coil lead therethrough for connection to the corresponding free wire end wrapped on said flap.
6. The coil in accordance with claim 1, and further comprising:
   a ring member removably mounted on said spool and extending axially from one end thereof which encircles said one flange to its other end which abuts said other flange to enclose the annular chamber and with said spool to form a substantially smooth annular disc shaped protective case for a wire winding disposed in the annular chamber; and
   said ring member having an opening therethrough for exposing said flap, and adjacent said opening overlapping the sides of said flap thereby retaining said flap in its displaced position.
7. The coil in accordance with claim 6, wherein:
   said spool is of unitary construction of a dielectric material;
   said flanges are disposed in spaced substantially parallel planes which are normal to said body;
   said flap is normally disposed before it is displaced in substantially the same plane as said first flange; and
   said ring member is of a dielectric material similar to said spool.
8. The coil in accordance with claim 6, wherein:
   said spool is of unitary construction of a dielectric material;
   said flanges are disposed in spaced substantially parallel planes which are disposed normal to said body, and said other of said flanges being of a larger diameter than said one of said flanges; and
   said ring member is of a dielectric material having an inner annular surface substantially corresponding in size to the annular periphery of said one flange and an outer annular surface substantially corresponding in size to the annular periphery of said other flange.
9. The coil in accordance with claim 8, wherein:
   said flap has a free end and a tab extending therefrom; and
   said other flange has a slot angularly aligned to receive said tab when said flap is displaced;
   said tab and slot forming said interengaging means for retaining said flap when it is displaced.
10. The coil in accordance with claim 9, wherein:
    said flap has a pair of openings each for passing a free end of a wire winding outwardly therethrough to be wrapped on said flap for connection thereto.
11. The coil in accordance with claim 9, wherein:
    said flap has a pair of openings each for passing a free end of a wire winding outwardly therethrough to be wrapped on said flap for connection thereto; and
    each of said openings being of sufficient size to pass a coil lead therethrough for connection to the corresponding free wire end wrapped on said flap.
12. The coil in accordance with claim 11, wherein:
    the opening through said ring member is a slot open at the end of said member which abuts said other of said flanges.

References Cited

UNITED STATES PATENTS

| 2,486,751 | 11/1949 | McMichael | 336—192 XR |
| 2,992,370 | 7/1961 | Laviana | 336—198 XR |
| 3,315,198 | 4/1967 | Biesma et al. | 336—192 |

G. HARRIS, Primary Examiner

U.S. Cl. X.R.

336—192